Patented Aug. 3, 1926.

1,594,521

UNITED STATES PATENT OFFICE.

ALBERT HINZE, OF PARLIN, NEW JERSEY, ASSIGNOR TO E. I. DU PONT DE NEMOURS & COMPANY, OF WILMINGTON, DELAWARE, A CORPORATION OF DELAWARE.

FILLER COMPOSITION FOR WOOD AND METAL.

No Drawing. Application filed March 13, 1922. Serial No. 543,480.

This invention relates to a filler composition which is especially adapted for use under a pyroxylin coating, and comprises a composition which contains as an essential component a resin of the character hereinafter described.

Many efforts have been made in the past to develop a satisfactory filler to be used under a pyroxylin solution. The main objection to the filler used under varnishes and paints has been the fact that pyroxylin solvents soften linseed oil, causing a wrinkling of the filler. Various combinations of glue and silex have been used, but the objection to these mixtures is that they dry too hard, so that they are difficult to sandpaper and are too brittle. Also, the lacquer does not adhere well to the filler coat.

The present invention comprises a filler that can be used with entire satisfaction under pyroxylin coatings on either wood or metal. The essence of my invention consists in using as a binder for the filler a resin that is at least partly soluble in the pyroxylin solvent used for the finish coats. I prefere to use an oleo resin such as elemi, but other resins may be used, for example, resin ester gum, or a hard resin together with a vegetable oil or balsam, and I may use more or less pyroxylin with the solution of rosin. As a solvent for the resin, I may use any of the well known volatile resin solvents, or mixtures of these volatile solvents with pyroxylin solvents such as amyl acetate and ethyl acetate. The invention, as has been indicated, is not limited to the solvents hereinafter mentioned, many other solvents that dry in the proper length of time being suitable.

The bulk of the filler is made up of silex (pulverized quartz) or similar material. I do not confine myself to the use of silex, but have found that for some types of work other materials, such as ground slate, zinc oxide, and yellow ochre, are preferable. Any of the so-called pigment materials, commonly used in paints, may be used as the basis of the filler in place of silex.

Altho my filler is designed especially to meet the requirements of pyroxylin coatings, it may be used under proper precautions as a filler for surfaces which are to be covered with varnish or paint. The only necessary precaution is to select a resin that is somewhat soluble in the paint or varnish vehicle, preferably in linseed oil.

My invention may be illustrated in more detail by the following examples:—

1. Silex filler for wood—

| | |
|---|---|
| Silex alone or in combination with other pigments | 60.0% |
| Gum elemi | 12.0% |
| Gasoline | 10.0% |
| Solvent naphtha | 18.0% |
| | 100.0% |

2. Silex filler for metal—

| | Per cent. |
|---|---|
| Silex alone or in combination with other pigments | 55.00 |
| Gum elemi | 10.00 |
| Gasoline | 25.00 |
| Solvent naphtha | 10.00 |
| | 100.00 |

3. Filler for use under paint or varnish—

I may use certain grades of resin or resin ester, or similar soft gum elemi or hard gums, as copal or sandarac, together with vegetable oil, such as raw linseed, rapeseed, or castor. The pigments may be either silex or silex in combination with other ordinary pigments.

| | Per cent. |
|---|---|
| Silex alone or in combination with other pigments | 55.00 |
| Copal | 10.00 |
| Castor oil | 2.00 |
| Fusel oil | 15.00 |
| Gasoline | 10.00 |
| Denatured alcohol | 8.00 |
| | 100.00 |

4. Filler for use on close grained wood and fairly smooth castings:—

Gum elemi, gasoline, solvent naphtha and such pigments as white lead, zinc oxide, iron oxide and earth pigments, either alone or in combination, may be used depending on the color required. In the case of wood, this filler may eliminate the necessity for using a stain.

|  | Per cent. |
|---|---|
| Zinc oxide | 50.00 |
| Gum elemi | 12.00 |
| Gasoline | 18.00 |
| Solvent naphtha | 20.00 |
|  | 100.00 |

5. Filler for use on wood and metal:—

|  | Per cent. |
|---|---|
| Turpentine resin | 12.00 |
| Silex alone or in combination with other pigments | 55.00 |
| Solvent naphtha | 33.00 |
|  | 100.00 |

6. Filler to be used on wood or metal under opaque finishes:

The formula is elemi, amyl acetate, fusel oil, nitrocellulose and silex. This filler is to be used where a perfectly smooth surface is desired having both filling and building up qualities, giving a very hard tough surface.

|  | Per cent. |
|---|---|
| Silex alone or in combination with other pigments | 55.00 |
| Gum elemi | 10.00 |
| Refined fusel oil | 10.00 |
| Amyl acetate | 23.50 |
| Nitrocellulose | 1.50 |
|  | 100.00 |

The proportions of non-volatile constituents of the filler may with advantage be taken within the following ranges:—

|  | Parts. |
|---|---|
| Filler base (silex, zinc oxide, etc.) | 45–65 |
| Resin binder | 8–15 |

Where a vegetable oil forms part of the composition, between 10 and 30%, based upon the amount of resin present will usually be sufficient. The proportions of nitrocellulose and solvents mentioned in the above, may also be changed considerably without departing from my invention.

I claim:—

1. A filler composition for wood and metal comprising silex, a soft oleo-resin, nitrocellulose and a volatile solvent of the resin and nitrocellulose.

2. A filler composition for wood and metal comprising silex, soft elemi resin, and a volatile solvent of the elemi resin.

3. A filler composition for wood and metal comprising silex, a resin, pyroxylin, and a volatile solvent of the resin and the pyroxylin.

4. A filler composition for a surface to be coated comprising between about 45 and 65 parts of a filler base and between about 8 and 15 parts of a resinous binder therefor that is at least partly soluble in the solvent used for the finish coat with which said surface is to be covered.

5. A filler composition for wood and metal comprising between about 45 and 65 parts of a filler base, between about 8 and 15 parts of a soft resin, and a volatile solvent of the resin.

6. A composition adapted to form a filler coat for wood and metal comprising between about 45 and 65 parts of a filler base, from about 10 to 12 parts of a resin that is at least partly soluble in the solvent used in the coating composition which is to come in contact with the filler coat, and a volatile solvent of said resin.

7. A filler composition as set forth in claim 2 which contains also nitrocellulose.

8. A filler composition as set forth in claim 4 which contains also nitrocellulose.

9. A filler composition as set forth in claim 5 which contains also nitrocellulose.

In testimony whereof I affix my signature.

ALBERT HINZE.